United States Patent
Bennett (10) Patent No.: US 7,725,935 B1
(45) Date of Patent: May 25, 2010

(54) DETECTING WORMS

(75) Inventor: Jeremy Bennett, Mountain View, CA (US)

(73) Assignee: Symantec Corporation, Cupertino, CA (US)

( * ) Notice: Subject to any disclaimer, the term of this patent is extended or adjusted under 35 U.S.C. 154(b) by 1098 days.

(21) Appl. No.: 11/016,555

(22) Filed: Dec. 17, 2004

(51) Int. Cl.
*H04L 9/32* (2006.01)
*H04L 29/02* (2006.01)

(52) U.S. Cl. .............................. 726/22; 726/24; 726/13

(58) Field of Classification Search ............. 726/22–26, 726/11–13
See application file for complete search history.

(56) References Cited

U.S. PATENT DOCUMENTS

| | | | |
|---|---|---|---|
| 2004/0117641 A1* | 6/2004 | Kennedy et al. | 713/188 |
| 2004/0117648 A1* | 6/2004 | Kissel | 713/200 |
| 2004/0128530 A1* | 7/2004 | Isenberg | 713/200 |
| 2004/0158725 A1* | 8/2004 | Szor | 713/188 |
| 2004/0261030 A1* | 12/2004 | Nazzal | 715/738 |
| 2004/0268150 A1* | 12/2004 | Aaron | 713/201 |
| 2005/0240780 A1* | 10/2005 | MacIsaac | 713/188 |

OTHER PUBLICATIONS

Aranya, Ashat et al. "In Search of a More Insidious Worm". Jun. 18, 2004. http://www.fsl.cs.sunysb.edu/~sean/parser.cgi?index.*
Wong, Cynthia et al. "Dynamic Quarantine of Internet Worms". Dec. 2003.*
Zou, Cliff et al. "Worm Propagation Modeling and Analysis under Dynamic Quatantine Defense". ACM(2003): 51-60.*
Internet Archive Wayback Machine(http://www.fsl.cs.sunysb.edu/~sean/parser.cgi?index).*
Sean Calllanan Homepage as of Jun. 18, 2004.*

* cited by examiner

*Primary Examiner*—Jung Kim
*Assistant Examiner*—Venkat Perungavoor
(74) *Attorney, Agent, or Firm*—Hunton & Williams LLP (57) ABSTRACT

Detecting a network worm is disclosed. Network traffic between a plurality of network nodes is monitored to determine if the traffic exhibits a characteristic associated with worm propagation. Responsive action is taken if it is determined that a portion of the network traffic does exhibit the characteristic associated with worm propagation. The characteristic associated with worm propagation comprises a data communication or a variant thereof arriving at a first node and propagating from the first node to a second node within a prescribed interval after arriving at the first node.

30 Claims, 8 Drawing Sheets

DETECTING WORMS

FIELD OF THE INVENTION

The present invention relates generally to computer security. More specifically, detecting worms is disclosed.

BACKGROUND OF THE INVENTION

A worm is a malicious self-replicating program that inserts itself into other systems in the same or slightly modified form to consume resources across a network. Once a host computer has been infected with a worm, it may be a matter of minutes before all of the vulnerable computers on the network are compromised. Some experts have even predicted this infection saturation time to reach mere seconds. Hence the loss in productivity and the resources required for worm cleanup can be astronomical if instant action is not taken after an infection. As network worms are becoming an even greater nuisance and a danger to the functionality and stability of the Internet, there exists a growing need to detect the presence of a worm in a network with speed and accuracy.

Current worm detection technologies center around detecting the actions of a single worm or a group of worms. For example, an exploit or vulnerability signature compiled from a list of worms known to exist can be used in anti-virus-like-software on the system level and in Intrusion Prevention Systems (IPS) on the network level to discover possible worm infections. Other techniques attempt to recognize worms by observing macro network behavior such as network saturation or anomalous device communications, e.g., by detecting a spike in traffic generally or of a particular type.

Though each of these techniques can be effective, they have significant drawbacks. The exploit and vulnerability signature approach requires some triggering foreknowledge that makes it hard to detect previously undiscovered worms that might have different exploit signatures or take advantage of new weaknesses not characterized by the vulnerability signatures. In addition, the growth in network bandwidth and traffic load in recent years has and continues to outstrip the processing capacity of a typical anti-virus and/or IPS systems and processes, with the result that typically not all network traffic can be examined as fully as may be required to reliably detected and/or block a worm, even in cases where a signature or other identifying data are known. While macro behavior observations are independent of specific worm signatures, such techniques typically do not provide the sort of specific, actionable, and timely information required to take quick real-time responsive action (e.g., to quarantine an infected system, network, or sub-network or timely isolate a critical system, network, or sub-network from potential sources of infection) since the observations only trigger alerts after a possible worm becomes a large enough problem to cause an anomaly in network behavior that is significant enough to be observed and trigger an alert. Unfortunately even after observing the anomaly, the user cannot know with certainty whether a particular system and/or network or portion thereof is or may be infected since a benign new program or system on the network could have easily altered network traffic patterns and even if a worm were present specific information about the worm such as may be needed to protect effectively against it typically is not available, at least initially. Additionally for both the signature and macro behavior approaches, the data analysis required for detection could be very computationally expensive. Therefore, it would be desirable to have a better way to identify the existence of a worm in a computer network.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Worm detection is disclosed. In one embodiment, network traffic between a plurality of network nodes is monitored to determine if the traffic exhibits a characteristic associated with worm propagation. In one embodiment, the characteristic associated with worm propagation comprises a data communication or a variant thereof arriving at a first node and propagating from the first node to a second node within a prescribed interval after arriving at the first node. Responsive action is taken if it is determined that a portion of the network traffic does exhibit the characteristic associated with worm propagation.

Figure 1:
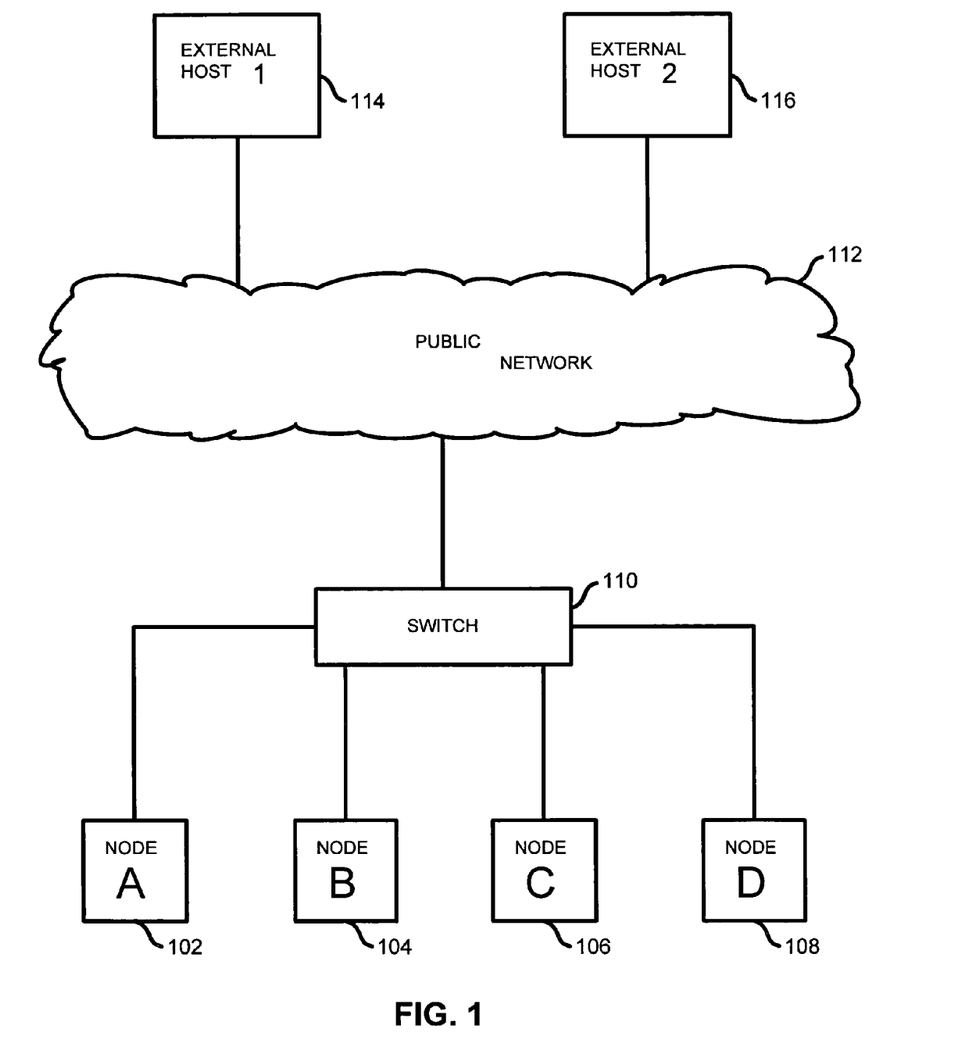
FIG. 1 is a diagram illustrating one embodiment of a network environment.

FIG. 1 is a diagram illustrating one embodiment of a network environment. In this example, computer nodes A-D (102, 104, 106, 108) are connected by a switch (110) to a public network (112), which connects to other hosts such as external hosts 1 and 2 (114, 118). In one embodiment, public network 112 is the Internet. In other embodiments computer nodes A-D (102-108) may be connected by switch (110) via any public or private network and/or combination thereof, including without limitation the Internet, intranet, LAN, WAN, and other forms of connecting multiple systems and or groups of systems together. This example of the network has been simplified to illustrate the embodiment clearly. Other network components such as firewalls, routers, or any other network-switching device could exist in addition or as a replacement to the switch component (110). If external host 1 (114) becomes infected with a malicious self-propagating worm, it can infect node A (102) via the public network (112) and the switch (110). The worm may be configured to propagate by any one or more of a number of methods, such as by sending itself from an originating and/or infected system to a target system as an e-mail or other message or by exploiting an unprotected connection port on the host. The worm may compromise the host in any number of ways, such as by tricking a user into running executable code and/or by exploiting a known vulnerability of an application or process running on the target system.

Figure 2:
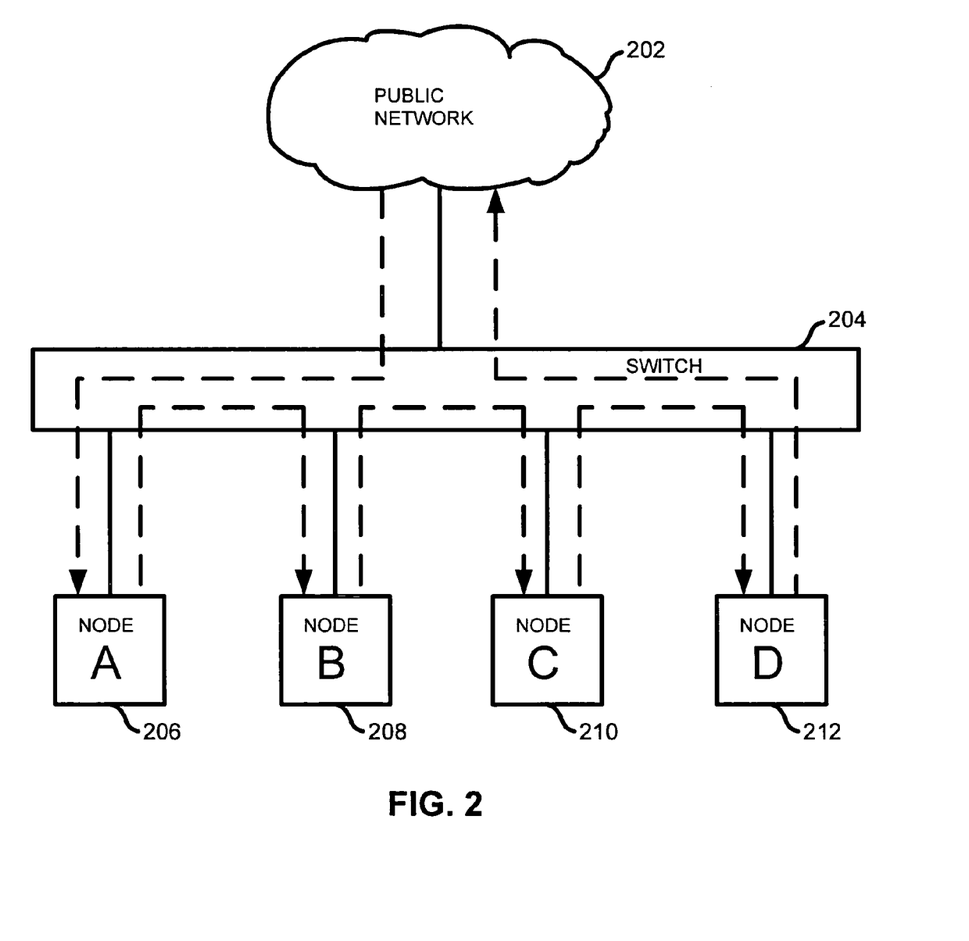
FIG. 2 is a diagram illustrating one embodiment of worm propagation in a network environment.

FIG. 2 is a diagram illustrating one embodiment of worm propagation in a network environment. In the example shown, a worm sent to node A (206) through the public network (202) and switch (204) infects node A (206). Through a network port or other connection on the node, the worm tries to infect other vulnerable hosts accessible by node A (206), e.g., other nodes connected to switch (204). Typically, the worm will attempt to propagate itself to such other nodes using the same destination port on such other nodes as the destination port it used to infect node A (206). The source port indicated for the communications by which the worm attempts to propagate itself may or may not be the same as in the communication used to infect node A (206). In the example shown, the worm propagates itself from node A (206) to node B (208) through the switch (204). In turn after node B (208) is infected, the worm in node B (208) propagates itself to node C (210) through the switch (204). The worm continues to propagate in this pattern infecting one node at a time until in the extreme case all vulnerable nodes in the network have been infected. Finally, in this example the worm in node D (212) will try to infect other hosts back out on the public network (202). While the worm is shown in the example illustrated in FIG. 2 as hopping from node-to-node one node at a time, depending on the worm, the host, the network topography and configuration, and/or other factors, the worm may instead attempt to propagate itself from an infected or compromised host to more than one other target host. Also, while in this example the worm propagates itself to all of the local nodes associated with switch (204) before attempting to propagate itself to an external host, in other cases the worm may propagate to internal and external hosts at the same time and/or in any combination or order. The common characteristic in all these cases is the fact that by their nature worms tend to follow a pattern of arriving at a host, compromising the host (i.e., getting sufficient control of the host to get or configure the host to do the mischief the worm was designed to do), and using the host to try to propagate itself to one or more other hosts, usually within a relatively short time frame after arriving at and compromising a host. This node-to-node propagation pattern is referred to herein as "transitive propagation" of the worm. In the example shown in FIG. 2, the switch (204) would be involved in routing all traffic containing the worm and consequently would have witnessed five instances of worm propagation. In one embodiment, the switch (204) or some other network node having a similarly good vantage point from which to observe the transitive propagation behavior described above, is configured to detect and respond to the presence of a worm within the network by determining whether network communications processed or otherwise available to be observed by the node exhibit such transitive propagation behavior or, in one embodiment, behavior that may be associated with and/or indicative of such behavior such that further inspection or processing is warranted. In an embodiment, the switch or any other networking component routing network traffic could be modified or added to detect and respond to worms.

Figure 3:
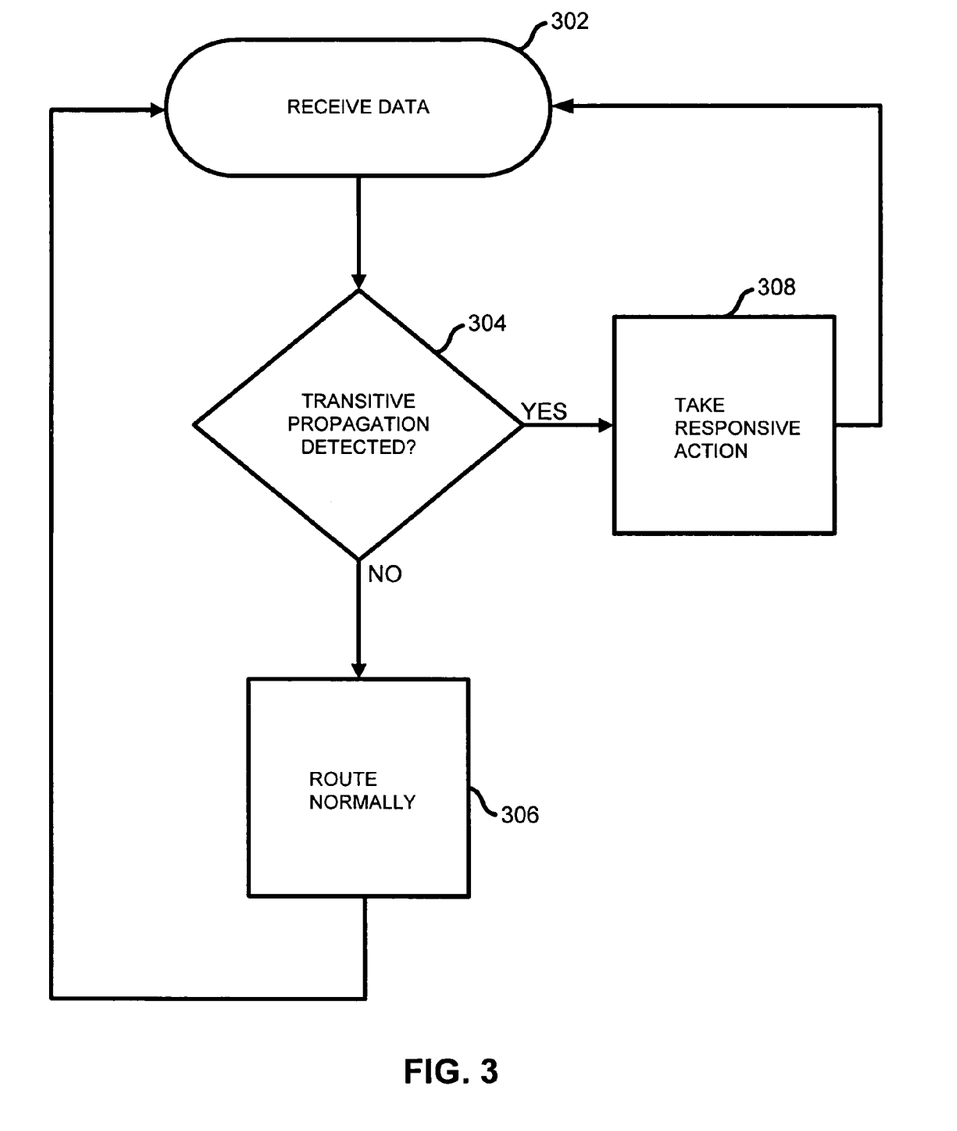
FIG. 3 is an overview flowchart of a process used in one embodiment to detect a worm.

FIG. 3 is an overview flowchart of a process used in one embodiment to detect a worm. In one embodiment, the process of FIG. 3 is implemented on a switch, router, firewall, intrusion detection system, and/or some other network device positioned and/or configured to observe traffic between two or more hosts. In one embodiment, the process of FIG. 3 is implemented on a switch, such as switch (204) of FIG. 2. Network data traffic is received in 302. The received network data traffic is analyzed in 304 to determine if it exhibits behavior that is or may be indicative of transitive propagation. If transitive propagation is not detected, the data are routed as usual to the appropriate destination (e.g., the host or other node to which it is addressed) in 306, and further data are received in 302. However if transitive propagation is detected, responsive action is taken in 308. In one embodiment, the responsive action includes sending an alert. In one embodiment, the responsive action includes blocking the data. In one embodiment, the responsive action includes storing data and/or information associated therewith. In one embodiment, the responsive action includes performing further analysis to determine whether the data are associated with benign traffic that might also exhibit transitive propagation patterns. In one embodiment, the responsive action includes isolating one or more systems believed to have been infected by the worm. In one embodiment, the responsive action includes isolating a network or portion thereof believed to have been infected by the worm to prevent the worm from propagating beyond the infected network or portion thereof. In one embodiment, the responsive action includes isolating a network or portion thereof that is not yet believed to have been infected in an attempt to prevent the network or portion thereof from becoming infected. Although this embodiment described a real-time detection method, an alternative embodiment could also use historical traffic data to identify transitive propagation for detecting network worms. In one such embodiment, the data received in 302 comprises historical data. The historical data used for analysis may be in the form of network traffic recordings or summaries of network communications such as NetFlow statistics.

Figure 4:
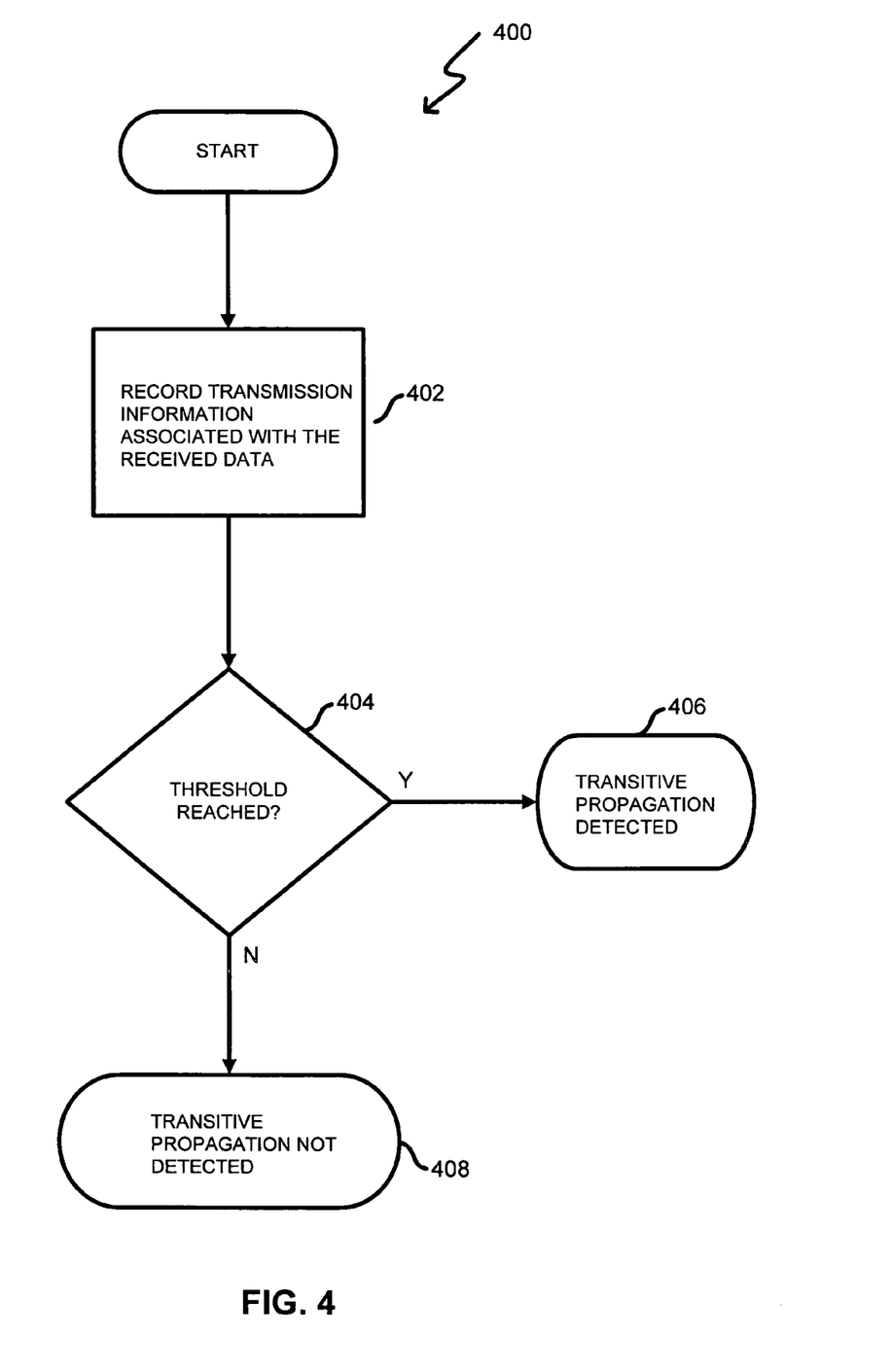
FIG. 4 is a flowchart of a process used in one embodiment to determine whether network data traffic exhibits transitive propagation.

FIG. 4 is a flowchart of a process used in one embodiment to determine whether network data traffic exhibits transitive propagation. In one embodiment, the process 400 of FIG. 4 is used to implement 304 of FIG. 3. When new network data traffic is received, transmission information associated with the received traffic is recorded in 402. In one embodiment, the information recorded includes the destination port number, an origination email address, or any other type of identifier that can be used to trace transitive propagation of network data. In one embodiment, 402 includes storing at least a portion of a body portion of the transmission information. In 404, a metric is updated, if appropriate, based on the recorded network information, and it is determined whether the value of the metric is equal to or greater than a threshold value associated with transitive propagation. In one embodiment, the metric reflects a number of times the same network data traffic and/or a variant thereof has been observed to have been sent to a first host and then sent by the first host to a second host within a prescribed period of time. In one embodiment, the period of time is preconfigured. In one embodiment, the period of time is configurable. In one embodiment, the period of time is a relatively short period of time, based on the expectation that a typical worm will attempt to propagate itself by sending itself (or a variant of itself) from an infected host to other hosts within a short period of time after having compromised the infected host. If the value of the metric is equal to or greater than the threshold value associated with transitive propagation, it is concluded at 406 that transitive propagation has been detected. If the threshold has not been reached, it is concluded at 408 that transitive propagation has not been detected. In one embodiment, the threshold is adjustable to allow the user to set the sensitivity level of the transitive propagation detection according to the security needs, requirements, and/or preferences of the user. In some embodiments, an external device, program, or a remote user automatically sets the threshold level. In one embodiment, setting the threshold level consists of defining the number of hops, as discussed in connection with FIG. 2, required to be classified as transitive propagation and adjusting the time window between the first and the last hop considered for transitive propagation.

Figure 5A:
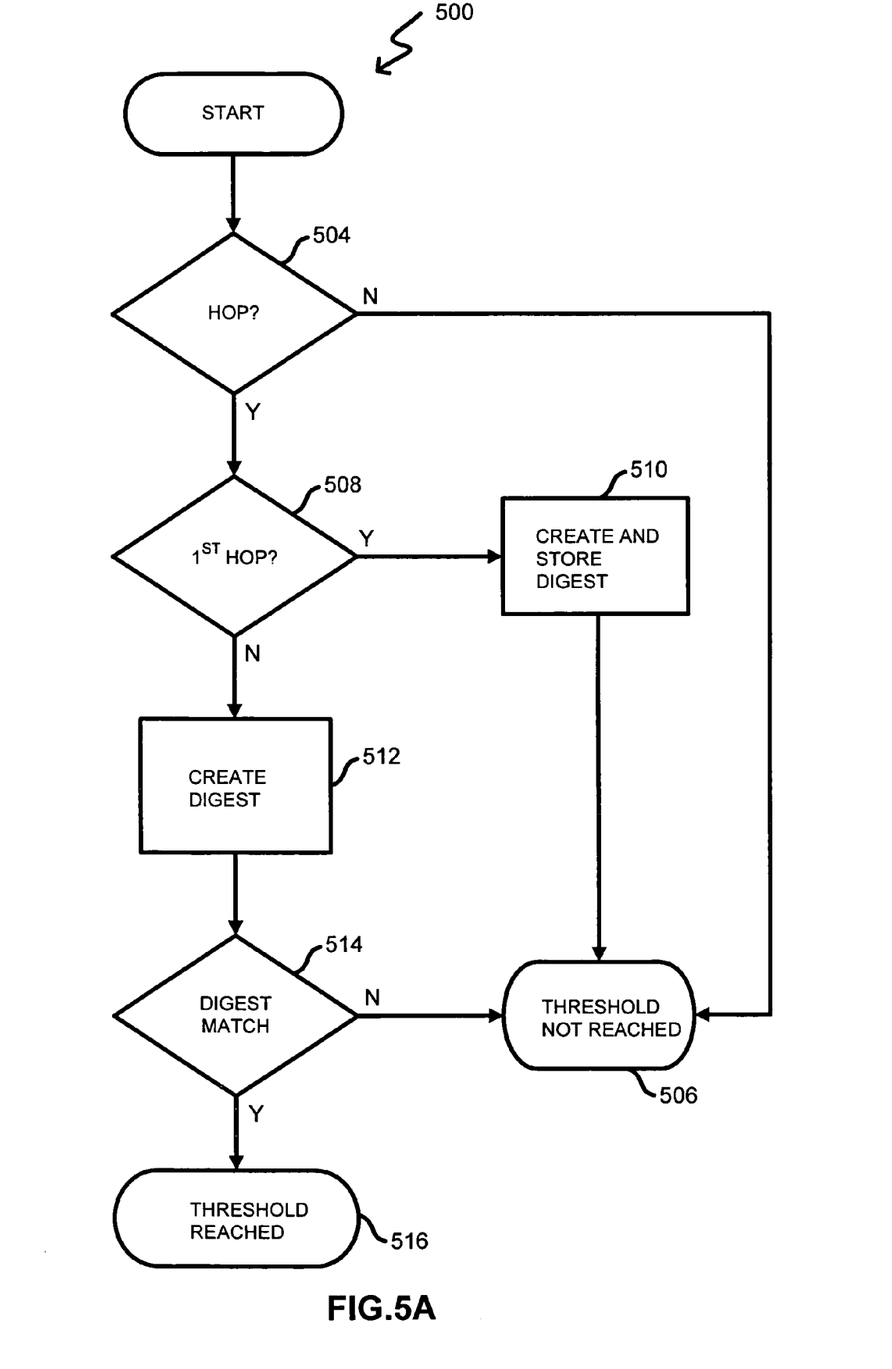
FIG. 5A is a flowchart of a process used in one embodiment to determine if a transitive propagation detection threshold has been reached.

FIG. 5A is a flowchart of a process used in one embodiment to determine if a transitive propagation detection threshold has been reached. In one embodiment, the process 500 of FIG. 5A is used to implement 404 of FIG. 4 using two hops as the threshold level. As used herein, the term "hop" refers to an instance of a network communication arriving at a network node and the same network communication or a variant thereof being sent out by the same network node within a prescribed time interval. The most recently observed transmission information is analyzed in 504 to determine whether a pattern associated with a hop has been detected. In one embodiment, the most recently observed transmission is considered in light of information received at a sending node associated with the most recently observed transmission within a prescribed time interval or window to determine if the transmission may be related to an inbound transmission received by the sending node within the prescribed interval or window. In one embodiment, this determination is made at least initially based on whether the sending node received within the prescribed interval or window a transmission associated with the same destination port as the destination port to which the most recently observed transmission is directed. If a pattern associated with a hop is not detected in 504, it is concluded in 506 that the transitive propagation detection threshold has not been reached. If it is determined in 504 that a pattern associated with a hop has been detected, it is determined in 508 whether the hop (or possible hop) is the first such hop detected. If the detected hop is the first such hop detected, a digest associated with the transmission data is created and stored in 510 and it is concluded in 506 that the transitive propagation detection threshold has not been reached. In one embodiment the digest created and stored in 510 is associated with a body portion of the transmission data. In one embodiment, 510 includes storing all or a portion of the transmission data. The digest in 510 incorporates a configurable amount of drift in data to produce the same digest for the purposes of digest matching such that even a polymorphic worm, i.e., one that at least slightly changes its form/content as it propagates, can be detected. In some embodiments, slight variations in the contents of worm-propagating communications are handled by allowing some leeway in determining whether a match has been identified between the respective digests (or other representation of content) of two communications. This process of creating a digest to characterize data, including by doing so in a way such that slightly different instances of a polymorphic worm may be identified as being associated with the same worm, is well known to those of ordinary skill in the art. If it is determined in 508 that the detected hop is not the first such hop detected, a digest associated with the most recent transmission is created in 512. In 514, this digest is matched with the digest previously created and stored in 510. If the digest created in 512 matches the digest created and stored in 510, it is concluded in 516 that the transitive propagation threshold has been reached. If the digest created in 512 does not match (or does not match sufficiently) the digest created and stored in 510, it is concluded in 506 that the transitive propagation threshold has not been reached. Although this embodiment incorporated the steps of using digests to more accurately match transmission data, in other embodiments full or partial content comparison to more reliably determine that transitive propagation has been detected may be achieved in other and/or different ways. In some alternative embodiments, no content comparison is performed.

Figure 5B:
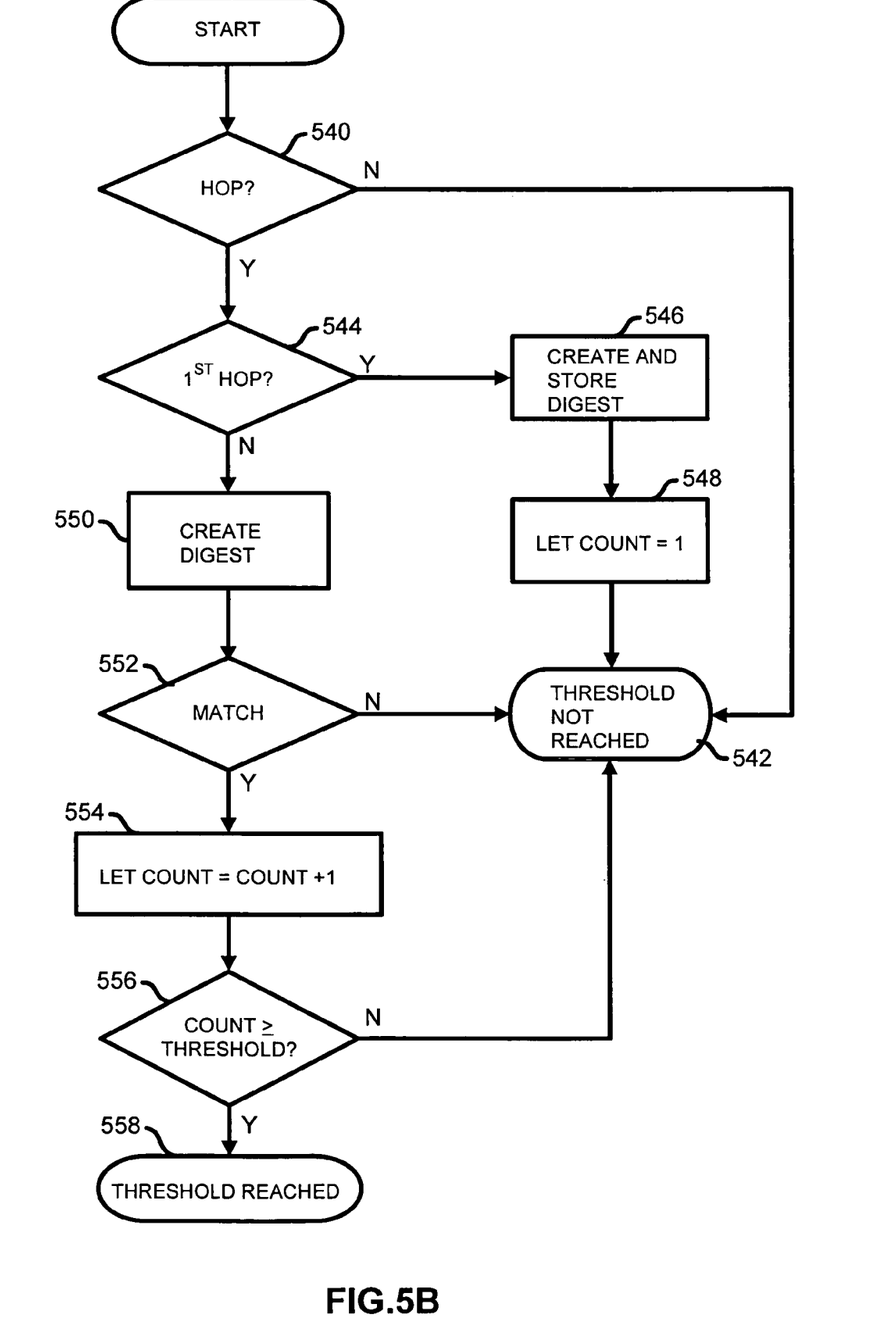
FIG. 5B is a flowchart of a process used in one embodiment to determine if a transitive propagation detection threshold has been reached.

FIG. 5B is a flowchart of a process used in one embodiment to determine if a transitive propagation detection threshold has been reached. In one embodiment, the process of FIG. 5B is used to implement 404 of FIG. 4 using an arbitrary configured and/or user configurable number of hops as the threshold level. It is determined in 540 whether a pattern associated with a hop has been detected. If a hop is not detected in 540, it is concluded in 542 that the transitive propagation detection threshold has not been reached. If it is determined in 540 that a pattern associated with a hop has been detected, it is determined in 544 whether the hop (or possible hop) is the first such hop detected. If the detected hop is the first such hop detected, a digest associated with the body of the transmission data is created and stored in 546, a hop count variable "count" is initialized with a value of "1" at 548, and it is concluded in 542 that the transitive propagation detection threshold has not been reached. If it is determined in 544 that the detected hop is not the first such hop detected, a digest associated with the most recent transmission is created in 550. In 552, this digest is matched with the corresponding digest previously created and stored in 546. If the digest created in 550 does not match (or does not match sufficiently) the digest created and stored in 546, it is concluded in 542 that the transitive propagation threshold has not been reached. If the digest created in 550 matches the digest created and stored in 546, the variable "count" is incremented by one at 554. It is determined at 556 whether the value of the variable "count" is greater than or equal to an applicable threshold value associated with the hop count variable. In one embodiment, the threshold represents a number of hops that must be observed in order for it to be concluded that transitive propagation, such as may be indicative or a worm, has been observed. In one embodiment, the threshold is a factory set value. In one embodiment, the threshold is a user configurable value. In one embodiment, the threshold is static. In one embodiment, the threshold is dynamic and may be varied based on such factors as user input, threat conditions, data received from network security systems, processes, or service providers, etc. In one embodiment, the threshold may be different for different types of traffic. For example, benign electronic mail traffic may exhibit transitive propagation in certain circumstances, e.g., as a message is forwarded from an originating host to a mail server associated with the originator and then by the originator's mail server to yet another mail server, possibly through a network connection, for delivery to the intended recipient.

In one embodiment, if the network traffic is observed to have made one or more "hops" as described herein, the threshold for detection may be set to a higher number of hops (e.g., 4 hops) than the threshold applied to other traffic (e.g., 2 hops). In one embodiment, a similar approach is used if one or more of the hops is/are associated with a node known to serve as a proxy for one or more other nodes. For such a node, a traffic pattern of one or two hops may be benign, but more than that would be more likely to indicate worm propagation. In one embodiment, a "white list" of such proxy nodes may be maintained and a higher hop count threshold applied to traffic involving them. In one embodiment, the threshold applied to a node known or believed to serve as a proxy may depend on such factors as network topology, historically observed data, etc. If it is determined at 556 that the hop count is greater than or equal to the threshold, it is concluded in 558 that the transitive propagation threshold has been reached.

Figure 6:
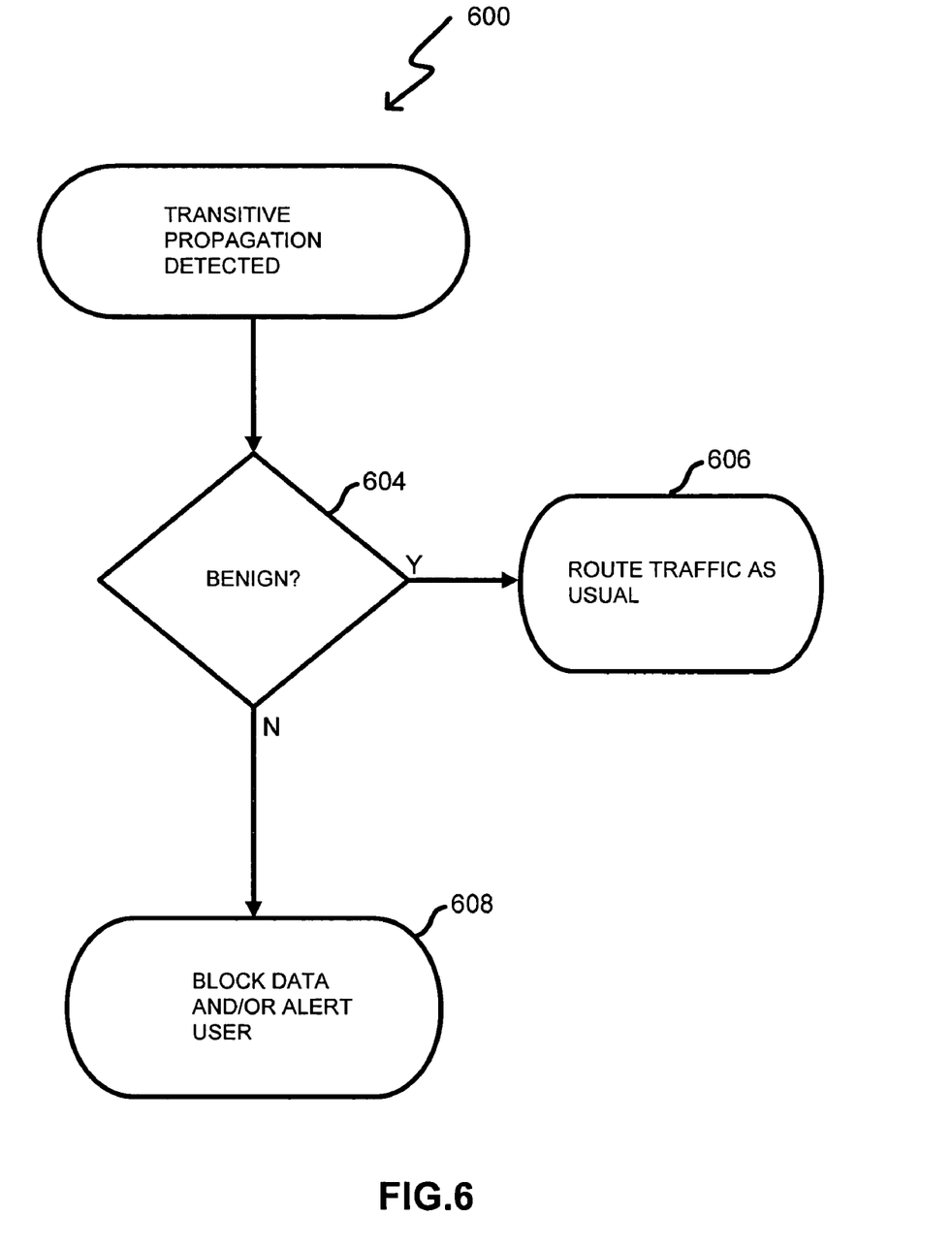
FIG. 6 is a flowchart of a process used in one embodiment to respond after detecting a transitive propagation.

FIG. 6 is a flowchart of a process used in one embodiment to respond after detecting a transitive propagation. In one embodiment, the process 600 of FIG. 6 is used to implement 308 of FIG. 3. When transitive propagation is detected, the network traffic information and data are further analyzed in 604 to determine whether the traffic is benign traffic of a type known to exhibit transitive propagation properties. Some of these might include proxy servers, networked multiplayer games, or even more commonly email. In one embodiment, the further analysis performed in 604 includes in the case of email traffic checking the destination email address to determine whether it changes from hop to hop. If not, the email traffic is determined to reflect benign forwarding of a message to its ultimate destination. If the address changes with each hop, the email traffic is determined to not be benign, because such a pattern indicates the message is hopping from final destination to final destination, as opposed to being forwarded, which behavior is associated with certain network worms that propagate via email. In one embodiment, the further analysis performed in 604 includes performing in at least certain cases a full content comparison of the communications associated with each hop. In one embodiment, it is determined that the traffic is benign if the full content comparison fails to confirm that the same content, or a variant thereof, was sent in each of the detected hops. If it is determined in 604 that the traffic is benign, the traffic is routed as usual in 606. However, if it is not determined in 604 that the traffic is benign, appropriate action is taken to alert the appropriate users and to block and quarantine the traffic for further analysis.

Figure 7:
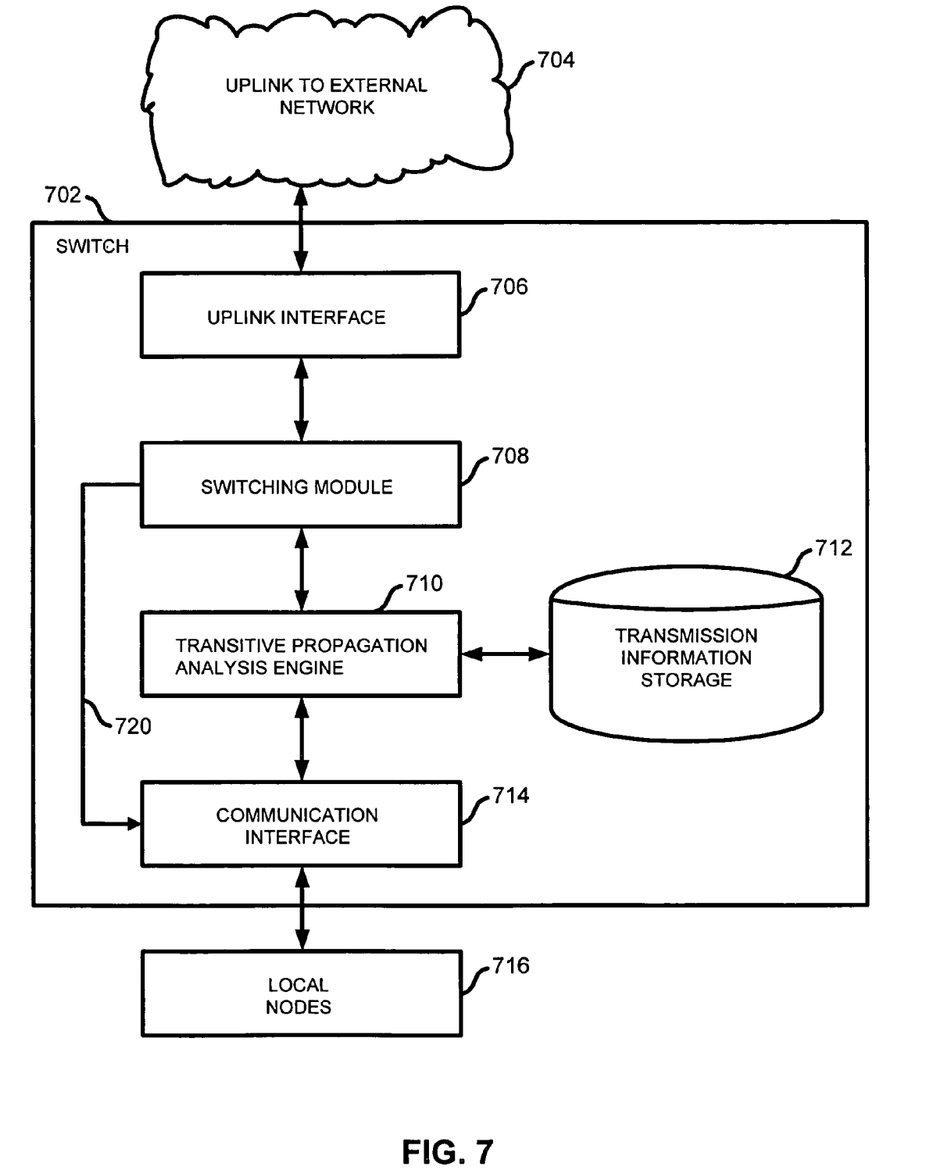
FIG. 7 is a diagram illustrating one embodiment of a system used to detect transitive worm propagation.

FIG. 7 is a diagram illustrating one embodiment of a system used to detect transitive worm propagation. The switch (702) is connected to an external network (704) by an uplink interface (706). The switch further includes a switching module (708) that performs the bulk of the switch functionality by routing network traffic to the appropriate destinations, such as based on their source and/or destination address. The switch (702) also includes a communication interface (714) that handles the communication to/from the local nodes (716) associated with the switch (e.g., those hosts connected to the physical ports of the switch (702). A transitive propagation analysis engine (710) is interposed in the path of network communications being sent to/from the local nodes (716) via switch (702). In one embodiment, the transitive propagation analysis engine is configured to detect network communications that exhibit transitive propagation. In one embodiment, the transitive propagation analysis engine (710) is configured to implement one or more of the processes described above in connection with FIGS. 1-6. The transitive propagation analysis engine (710) is connected to a transmission information storage (712). In one embodiment, the analysis engine (710) is configured to store in transmission information storage (712) data that is and/or may be used to detect transitive propagation, such as by detecting network communication hops as described herein. In one embodiment, the analysis engine (710) stores transmission information for a prescribed and/or configurable number of most recent network communications processed by switch (702). In the example shown, a bypass path (720) allows for traffic sent between local nodes to bypass transitive propagation analysis engine (710) on its way out to the local destination node, because such traffic would already have been processed on its way into switching module (708) from the sending local node. In one alternative embodiment, switch (702) is configured (other than as shown in FIG. 7) such that engine (710) only analyzes a transmission when data are received from the external network (704) or when data sent by a local node (716) is routed by the switching function (708) to be received by another local node (716). In such an embodiment, outgoing traffic is never analyzed and instead bypasses the transitive propagation analysis engine (710) to directly communicate with the switching function (708). This is done to reduce the required amount of data analyzed by the engine (710) protecting the local nodes (716).

In the example shown in FIG. 7, the system comprises a switch (702), but in other embodiments, the component performing the transitive propagation analysis could be any component connected to a network, including without limitation a router, firewall, or intrusion detection or other security system. In one embodiment, the data used to detect transitive propagation depends on the type of device used. For example, in one embodiment a switch is configured to detect transitive propagation by tracking network transmission information such as Ethernet addresses and/or physical port numbers. By contrast, a router may use IP addresses and/or port numbers whereas a firewall or other device typically placed between networks may observe other and/or further data, such as data associated with communications from one network to another.

The components shown in FIG. 7 and described above may be implemented in any suitable way, such as one or more integrate circuits and/or other devices, or as firmware, software, or otherwise.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of detecting a network worm, comprising:
   monitoring network traffic among a plurality of network nodes;
   determining whether the traffic exhibits a characteristic associated with worm propagation, including by:
      observing that a data communication arrives at a first node; and
      determining that a substantially similar data communication leaves the first node for one or more second nodes within a prescribed interval after arriving at the first node, indicating a possibility that the first node was infected by a worm; and
   taking responsive action if it is determined that a portion of the network traffic does exhibit the characteristic associated with worm propagation.

2. A method as recited in claim 1, further comprising detecting whether the substantially similar data communication propagates from the second node to a third node within the prescribed interval after arriving at the second node.

3. A method as recited in claim 1, further comprising detecting whether the substantially similar data communication arrives at, and propagates within the prescribed interval after arrival from, a minimum number of nodes in addition to the first node.

4. A method as recited in claim 3, wherein the minimum number of nodes is configurable.

5. A method as recited in claim 3, wherein the minimum number of nodes is preconfigured.

6. A method as recited in claim 3, wherein the minimum number of nodes is different for different types of data communication.

7. A method as recited in claim 1, wherein the prescribed interval is configurable.

8. A method as recited in claim 1, wherein the prescribed interval is preconfigured.

9. A method as recited in claim 1, wherein monitoring network traffic comprises storing data associated with the data communication if the network traffic is determined to exhibit the characteristic associated with worm propagation.

10. A method as recited in claim 9, wherein the stored data comprises a message digest.

11. A method as recited in claim 9, wherein the stored data comprises at least a portion of the data communication.

12. A method as recited in claim 9, wherein monitoring network traffic further comprises using the stored data to identify as related two or more occurrences, observed with respect to separate target nodes, of the data communication or a variant thereof arriving at a target node and propagating from the target node to another node within the prescribed interval after arriving at the target node.

13. A method as recited in claim 1, wherein the network traffic is monitored in real time.

14. A method as recited in claim 1, wherein the network traffic comprises historical network data.

15. A method as recited in claim 14, wherein the historical network data comprises a network traffic recording.

16. A method as recited in claim 14, wherein the historical network data comprises a summary of network communications.

17. A method as recited in claim 14, wherein the historical network data comprises NetFlow statistics.

18. A method as recited in claim 1, wherein the network traffic comprises historical network data communicated and recorded at a time prior to said monitoring being performed.

19. A method as recited in claim 1, wherein the responsive action comprises sending a report.

20. A method as recited in claim 1, wherein the responsive action comprises logging information.

21. A method as recited in claim 1, wherein the responsive action comprises blocking network traffic associated with the data communication or a variant thereof.

22. A method as recited in claim 1, wherein the responsive action comprises storing further analysis data associated with the data communication.

23. A method as recited in claim 1, wherein the responsive action comprises processing normally benign network traffic that exhibits the characteristic associated with worm propagation.

24. A method as recited in claim 1, further comprising processing normally benign network traffic that exhibits the characteristic associated with worm propagation.

25. A system for detecting a network worm, comprising:
a processor configured to:
monitor network traffic among a plurality of network nodes;
determine whether the traffic exhibits a characteristic associated with worm propagation, including by:
observing that a data communication arrives at a first node; and
determining that a substantially similar data communication leaves the first node for one or more second nodes within a prescribed interval after arriving at the first node, indicating a possibility that the first node was infected by a worm; and
take responsive action if it is determined that a portion of the network traffic does exhibit the characteristic associated with worm propagation; and
a memory configured to store data associated with the network traffic.

26. A system as recited in claim 25, wherein the system comprises a device associated with a network with which the network traffic is associated.

27. A system as recited in claim 26, wherein the device comprises a switch.

28. A system as recited in claim 26, wherein the device comprises a router.

29. A system as recited in claim 26, wherein the device comprises a firewall.

30. A computer readable storage medium for detecting a network worm, the computer readable storage medium storing computer instructions for:
monitoring network traffic among a plurality of network nodes;
determining whether the traffic exhibits a characteristic associated with worm propagation, including by:
observing that a data communication arrives at a first node; and
determining that a substantially similar data communication leaves the first node for one or more second nodes within a prescribed interval after arriving at the first node, indicating a possibility that the first node was infected by a worm; and
taking responsive action if it is determined that a portion of the network traffic does exhibit the characteristic associated with worm propagation.

* * * * *